United States Patent [19]

Waldron

[11] Patent Number: 4,513,690

[45] **Date of Patent: * Apr. 30, 1985**

[54] ANIMAL MUGGER

[76] Inventor: Curtis R. Waldron, Rte. 3, Box 2793, Okeechobee, Fla. 33472

[ * ] Notice: The portion of the term of this patent subsequent to Aug. 28, 2001 has been disclaimed.

[21] Appl. No.: 493,622

[22] Filed: May 11, 1983

Related U.S. Application Data

[63] Continuation-in-part of Ser. No. 414,801, Sep. 3, 1980, Pat. No. 4,467,746.

[51] Int. Cl.[3] .......................... A01K 1/062; A61D 3/00

[52] U.S. Cl. .......................................... 119/99; 119/103

[58] Field of Search .................... 119/98, 99, 103, 100, 119/102

[56] References Cited

U.S. PATENT DOCUMENTS

| | | | |
|---|---|---|---|
| 125,120 | 4/1872 | Cox | 119/99 |
| 408,257 | 8/1889 | Pattee | 119/99 |
| 963,357 | 7/1910 | Carr | 119/99 |
| 3,087,195 | 4/1963 | Marshall et al. | 119/99 |
| 3,092,871 | 6/1963 | Marshall et al. | 119/99 |
| 3,777,715 | 12/1973 | Hill et al. | 119/99 |
| 3,997,940 | 12/1976 | Prince et al. | 119/99 |
| 4,467,746 | 8/1984 | Waldron | 119/99 |

*Primary Examiner*—Hugh R. Chamblee
*Attorney, Agent, or Firm*—Carroll F. Palmer

[57] ABSTRACT

A mugger for use with an animal chute to immobilize the head of an animal held within the chute includes a pair of slotted elongated tubular members that are fixed to the exit gate of the chute with the slots facing outward. Bracket members are positively moved vertically both up and down in the slots by a chain arrangement. A sling suspended between the bracket members moves from a position resting on the ground adjacent the exit gate to a elevated position to engage the head of the animal held in the chute for tagging, treatment or the like.

3 Claims, 8 Drawing Figures

2
4
8
12
14
24
42
44
46
52
104
106
108
56
62
96
54
94
92
50
90
88
86
84
102
82
100
6
10
16
18
20
22
26
28
30
32
33
34
36
48

ANIMAL MUGGER

CROSS-REFERENCE TO RELATED APPLICATION

Reference is made under the provisions of 37 C.F.R. 1.78 to my related, copending U.S. patent application entitled "Animal Mugger", Ser. No. 414,801, filed Sept. 3, 1982, now U.S. Pat. No. 4,467,746, the contents of which are incorporated herein by reference and, of which, this application is a continuation-in-part.

BACKGROUND OF THE INVENTION

1. Field of the Invention

This invention relates broadly to equipment for use in the tagging, medicinal treatment or like handling of cattle or other animals. More particularly, it concerns devices for attachment to animal chutes that can immobilize the head of an animal held in the chute for treatment.

2. Description of the Prior Art

From time to time, cattle and other domestic animals must be treated with medicinals, ear tagged, or subjected to various other treatments. To accomplish this cattle chutes have been developed to hold the animal so the treatment can be safely accomplished. Typically, the chutes comprise a pair of sides plus entrance and exit gates that pivot from an open position where the animal may be lead into the chute to a closed position where the chute sides clamp against the sides of the animal and its head extends through an opening in the exit gate. Animal chutes of this type have been commercially available for many years for use by ranchers, veterinarians, etc. (see for example "The Florida Cattleman and Livestock Journal" Vol. 46, No. 6, March 1982, pages 14, 36, 50 and 113, the disclosure of which in incorporated herein by reference).

Although the person administering the treatment, tagging, etc. is isolated from the legs and body of the animal by the closed chute, the animal is still able to move its head about. Hence, it is necessary to immobilize the head to effectively apply the treatment. In the past this has been done by stationing a person at the exit gate of the chute to physically grab hold of the animal's horns or other portion of its head to hold the head still while another person applies the treatment. The person holding the animal's head is known in the trade as a "mugger". The present invention provides a mechanical device to perform the job of the mugger thereby performing the head holding task more effectively and, at the same time, eliminating the cost of the human mugger in the animal treatment operation.

The devices disclosed in my aforesaid patent application Ser. No. 414,801 are capable of mechanically performing the the animal head holding task, but they were found to require improvement, namely, to provide positive movement of a head-holding sling in both the up and down directions.

In the slaughtering of animals, it has been known to use piston operated devices to hold the heads of animals still with the throat exposed so the animal may be slaughtered (see U.S. Pat. Nos. 3,087,195; 3,092,871 and 3,101,508). However, there is a critical difference between these prior art devices and those of the present invention. Thus, in the devices of this invention, it must be possible for the animal to walk out the chute after its treatment has been applied, whereas, in the prior devices when the animal has been slaughtered, the dead body, either in one piece or cut into sections, is hoisted out of the chute by an overhead meathook or the like so there are no exit gates on the slaughter chutes.

OBJECTS

A principal object of the present invention is the provision of new forms of animal treatment devices.

Further objects include the provision of:

1. New equipment to immobilize the heads of cattle or other animals held in a chute for tagging, medicinal treatment or the like.
2. Animal handling equipment that eliminates the need to employ a person known as a "mugger" in the tagging, medicinal treatment, etc. of cattle or other animals in a holding chute.
3. A mechanical mugger that may be attached to cattle chutes to replace the humans used in the past to immobilize the cattle's head during treatment in the chute.
4. Such a mugger in which a animal head-holding sling unit is positively moved by motor force in both a up and down direction.
5. New methods for mugging cattle held in a chute in the course of treating, tagging, etc. of the cattle.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished in part by the provision of a mechanical animal mugger which comprises first and second elongated tubular members, a longitudinal slot in each of the tubular members, means to mount the tubular members vertically on the outside of the exit gate of an animal chute with the slots facing away from the exit gate, a first bracket member structured to slide vertically in the slot of one of the tubular members, a second bracket member structured to slide vertically in the slot of the second of the tubular members, a sling member fixed to the bracket members so the sling member may be moved by the bracket members from a position resting on the ground adjacent the exit gate of the animal chute to a elevated position to engage the head of an animal held in the chute, and means to move the bracket members vertically along the tubular members.

In the preferred embodiments, the means to move the bracket members comprises a chain arrangement in which a chain runs around a plurality of sprockets to move the bracket members.

BRIEF DESCRIPTION OF THE DRAWINGS

A more complete understanding of the invention may be had by reference to the accompanying drawings in which.

DESCRIPTION OF THE PREFERRED EMBODIMENTS

With reference to the accompanying drawings in which like parts are identically numbered, the equipment 2 comprises an animal chute 4 constructed in accordance with the prior art and a mechanical mugger 6 constructed in accordance with the present invention.

Figures 1, 2, 3, 4:
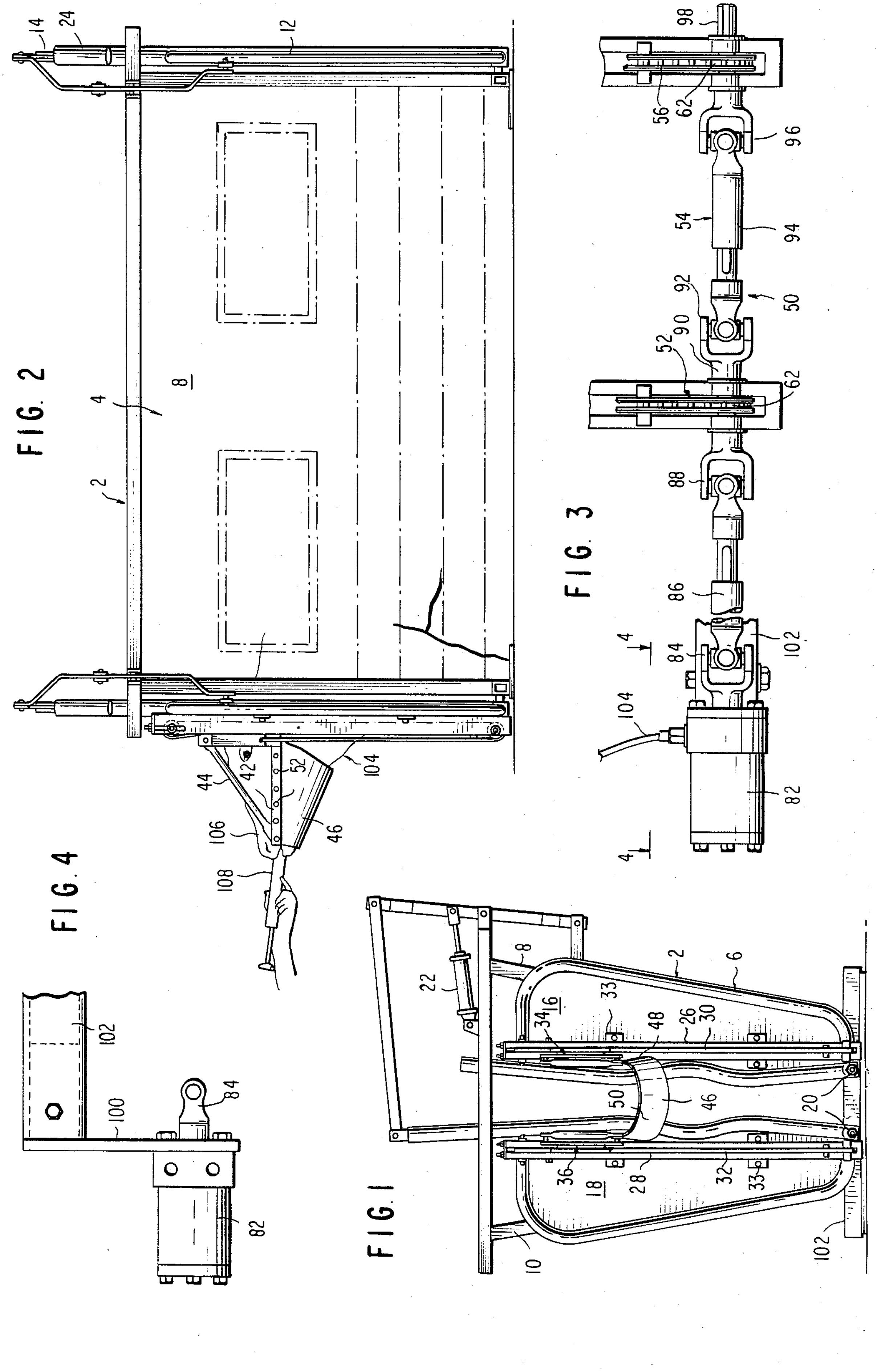
FIG. 1 is an elevational view of the exit gate of an animal chute to which is attached an animal mugger of the invention with the chute is its closed position.
FIG. 2 is a lateral view of the equipment shown in FIG. 1.
FIG. 3 is a fragmentary, plan view of the chain drive section of the animal mugger of the invention.
FIG. 4 is a sectional view taken on the line 4—4 of FIG. 3.
Figure 7:
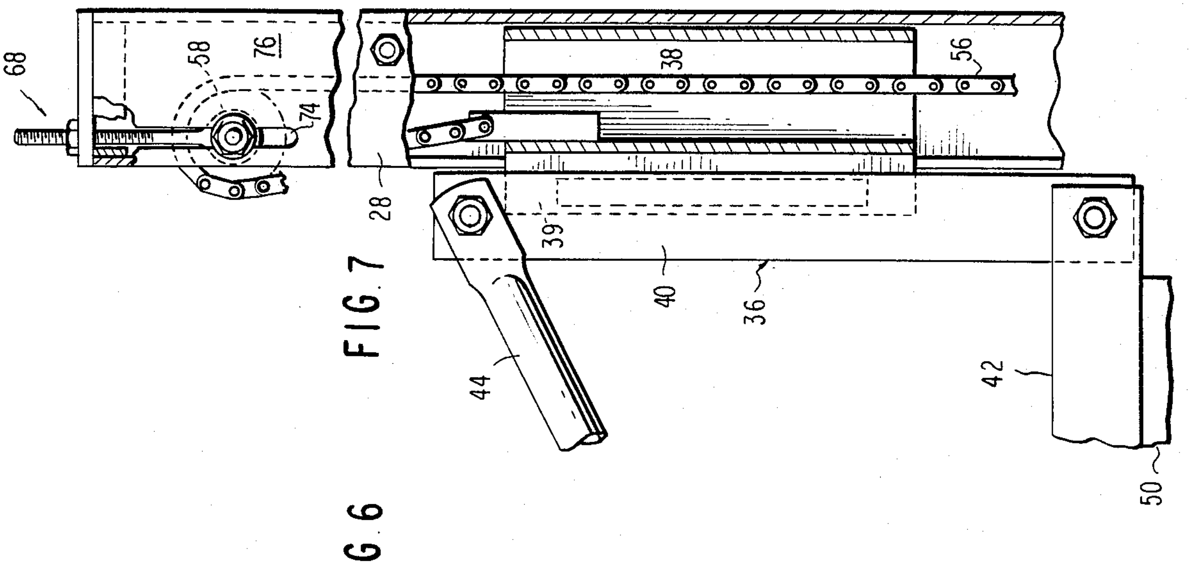
FIG. 7 is a lateral, fragmentary view, partially in section, corresponding to the elevational view of FIG. 6.
Figure 6:
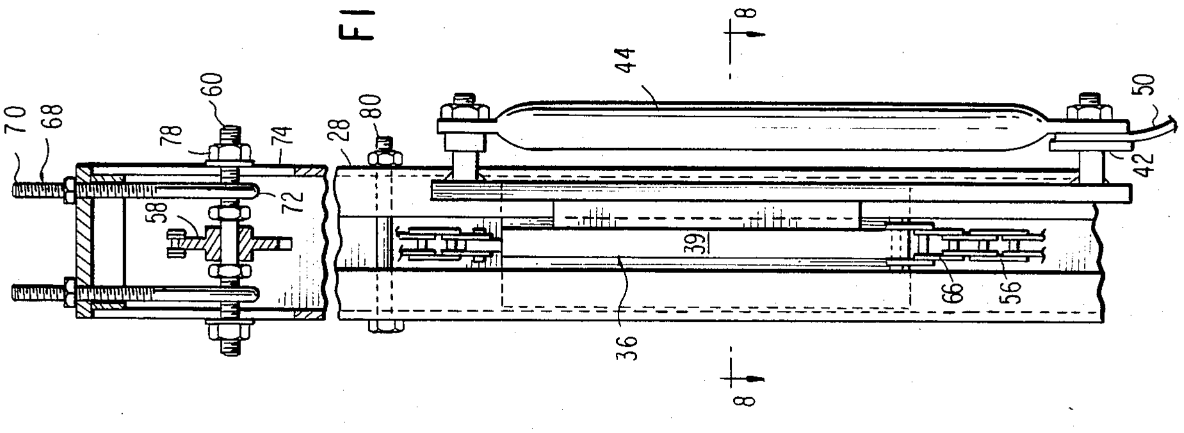
FIG. 6 is a fragmentary, elevational view, partially in section, of the drive chain tensioning arrangement of the equipment of FIG. 1.

The chute 4 comprises sides 8 and 10, an entrance gate formed of the two sections 12 and 14 and an exit gate formed of the two sections 16 and 18. The gate sections 16 and 18 are pivoted on bolts 20 for movement by piston means 22 between an opened position (see FIG. 5) and a closed position (see FIG. 1). The gate sections 12 and 14 are similarly pivoted (not shown) for movement by the piston means 24.

The mechanical mugger 6 comprises a first elongated tubular member 26 and a second elongated tubular member 28 provided with longitudinal slots 30 and 32. The members 26 and 28 are fixed to the gate sections 16 and 18 respectively by the lugs 33 with the slots 30 and 32 facing away from the sections 16 and 18.

Bracket members 34 and 36 are structured to slide vertically in the slots 30 and 32 respectively. The bracket members 34 and 36 each comprise a tubular section 38, a bar 39 fixed to the tubular section 38, a plate 40 carried by the bar 39 via the spacer 41, an extension 42 and a brace 44 joined to the extension 42 and plate 40. The tubular sections 38 are of a size that fit inside the tubular members 34 and 36.

A sling 46 is fixed at its sides 48 and 50 to the bracket extensions 42 by bolts 52 to slope downward toward the tubular members 26 and 28. Preferably, the sling 46 is made of ¼ in. thick fabric, e.g., a combination of nylon and rubber such as used for conveyor belts. Such fabric has been found to be able to withstand the abuse it receives from cattle exiting the chute.

The bracket members 34 and 36 and the attached sling member 46 are moved by the means 50 that comprises chain arrangements 52 and drive means 54.

The chain arrangements 52 each comprise a length of chain 56, an upper sprocket wheel 58 journalled on bolt 60 and a lower sprocket wheel 62 keyed to drive shafts as described below. The upper ends 64 of chains 56 are fastened to lugs 64 fixed to the inside of tubular sections 38 and the lower ends 66 are fastened to the bars 39. Between the fastened ends, the chains 56 run over the sprocket wheels 58 and 62 with a tension adjusted by tensioning means 68.

The tensioning means 68 comprises a pair of eye-bolts 70 with the bolt 60 extending through the eye portion 72 thereof and a pair of lateral slots 74 in the upper end 76 of the tubular member 28. The eye-bolts can be used to raise or lower the bolt 60 and, in turn, the sprocket wheel 58 to thereby tighten or loosen the the chain 56. Once positioned, the nuts 78 can be tightened to fix the bolt 60 and wheel 58 at the desired tension position. A cross bolt 80 may be included to limit the extent of upward movement of the bracket member 36.

The drive means 54 comprises a reversible, hydraulic or equivalent motor 82, the drive shaft of which is integral with a first universal joint 84, a first spline unit 86, second universal joint 88, first sprocket shaft 90 to which one of the sprocket wheels 62 is keyed for axial movement, a third universal joint 92, a second spline 94, a fourth universal joint 96 and a second sprocket shaft 98 to which the second sprocket wheel 62 is keyed for axial movement. The motor 82 is mounted via plate 100 to and beneath the base frame member 102 of the chute 4 so that the member 102 provides of protective cover for the elements that form the drive means 54.

The motor 82 is operated by hydraulic fluid delivered via pressure line 104 that leads to a control valve (not shown) located at the side of the chute 4. An electric motor or any other suitable power source can be used in place of the hydraulic motor 82.

Figure 5:
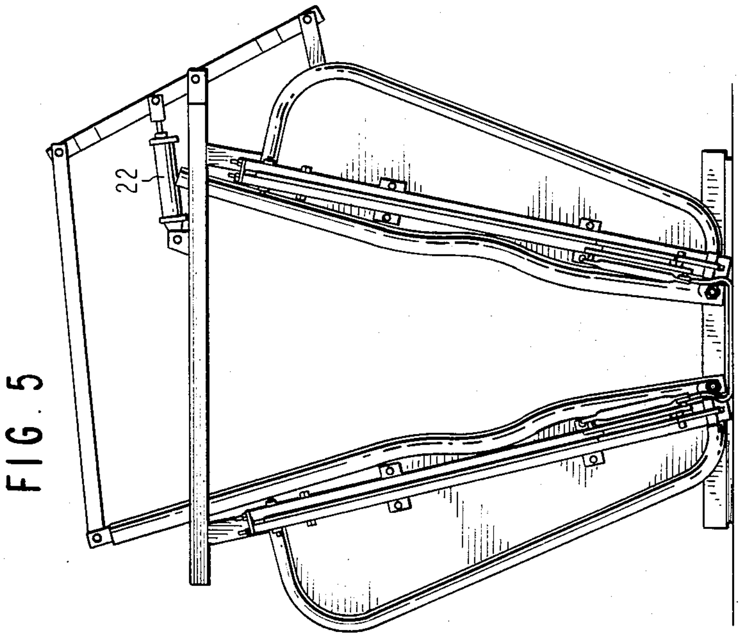
FIG. 5 is an elevational view similar to FIG. 1. but with the animal chute in the opened position.
Figure 8:
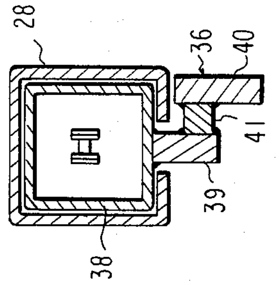
FIG. 8 is a sectional view taken on the line 8—8 of FIG. 7.

The mugger of the invention operates as follows. An animal treatment operation begins with the chute open as seen in FIG. 5. The cattle 104 is lead into the chute 4 through the opened gate sections 12 and 14 until the cattle's head 106 extends beyond the exit gate sections 16 and 18. Then the pistons 22 and 24 are pressurized to close the chute. This will bring the chute sides 8 and 10 against the body of the cattle 104 and its head 106 will extend beyond the closed exit gate with the neck of the cattle engaged by the gate sections 16 and 18. Thus, the animal is immobilized except for its head 106. Then, the motor 82 will be operated to drive the sprocket wheels 62 and, in turn, the chain 56 so as to raise the bracket members 34 and 36. This causes the sling 46 to engage and immobilize the head 106 of the cattle 104. At this point, the attendant is free to treat the animal, e.g., administer medicinals with a syringe 108. When the animal treatment is completed, the motor 82 drive direction is reversed to cause the chains 56 to positively move the bracket members 34 and 36 down so the sling 46 is lowered until it rests on the ground. Finally, the pistons 22 and 24 are operated to open the chute 4 and the animal leaves the chute 4 thorough the exit gate stepping over the lowered sling 46. Another cattle is then lead into the chute through the entrance gate and the operation is repeated until all necessary animals have been treated. Hence, the new equipment 2 enables the treatment operations to be handled by a single person in contrast to prior operations using the available cattle chutes where one person was required to hold the animal's head while a second person applied the treatment, tag. etc. to the animal.

The embodiments of the invention in which an exclusive property or privilege is claimed are defined as follows:

1. A mugger for use with a cattle chute having moveable sides and pivoted entrance and exit gates to immobilize the head of a cattle held within the chute which comprises:

first and second elongated tubular members, a longitudinal slot in each of said tubular members, means to mount said tubular members vertically on the outside of the exit gate of a cattle chute with said slots facing away from said exit gate, a first bracket member structured to slide vertically in said slot of one of said tubular members, a second bracket member structured to slide vertically in said slot of the second of said tubular members, a sling member fixed to said bracket members so said sling member may be moved by said bracket members from a position resting on the ground adjacent said exit gate of said animal chute to an elevated position to engage the head of an animal held in said chute, and chain means to move said first and second bracket members vertically along said tubular members.

2. A mugger for use with a cattle chute having moveable sides and pivoted entrance and exit gates to immobilizes the head of a cattle held within the chute which comprises:

first and second elongated tubular members, a longitudinal slot in each of said tubular members, means to mount said tubular members vertically on the outside of the exit gate of a cattle chute with said slots facing away from said exit gate, a first bracket member structured to slide vertically in said slot of one of said tubular members, a second bracket member structured to slide vertically in said slot of the second of said tubular members, a sling member fixed to said bracket members so said sling member may be moved by said bracket members from a position resting on the ground adjacent said exit gate of said animal chute to an elevated position to engage the head of an animal held in said chute, and chain means to move said first and second bracket members vertically along said tubular members, said chain means comprising a chain carried upon upper and lower sprocket wheels within one of said tubular members and a second chain similarly carried within the other of said tubular members.

3. A mugger for use with a cattle chute having moveable sides are pivoted entrance and exit gates to immobilize the head of a cattle held within the chute which comprises:

first and second elongated tubular members, a longitudinal slot in each of said tubular members, means to mount said tubular members vertically on the outside of the exit gate of a cattle chute with said slots facing away from said exit gate, a first bracket member structured to slide vertically in said slot of one of said tubular members, a second bracket member structured to slide vertically in said slot of the second of said tubular members, a sling member fixed to said bracket members so said sling member may be moved by said bracket members from a position resting on the ground adjacent said exit gate of said animal chute to an elevated position to engage the head of an animal held in said chute, and chain means to move said first and second bracket members vertically along said tubular members, said chain means comprising a chain carried upon upper and lower sprocket wheels within one of said tubular members and a second chain similarly carried within the other of said tubular members, said lower sprocket wheels being keyed for rotation to sprocket shafts that are driven via universal joints by a power source.

* * * * *